United States Patent
Iizuka et al.

(10) Patent No.: US 12,497,931 B2
(45) Date of Patent: Dec. 16, 2025

(54) INTERNAL COMBUSTION ENGINE CONTROL APPARATUS AND INTERNAL COMBUSTION ENGINE CONTROL METHOD

(71) Applicant: SUBARU CORPORATION, Tokyo (JP)

(72) Inventors: Madoka Iizuka, Tokyo (JP); Manabu Shoji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/884,209

(22) Filed: Sep. 13, 2024

(65) Prior Publication Data

US 2025/0109721 A1    Apr. 3, 2025

(30) Foreign Application Priority Data

Sep. 28, 2023  (JP) .................................. 2023-166692

(51) Int. Cl.
  *F02D 43/04*    (2006.01)
  *F02P 5/04*    (2006.01)
(52) U.S. Cl.
  CPC .............. *F02D 43/04* (2013.01); *F02P 5/045* (2013.01)
(58) Field of Classification Search
  CPC ........ F02D 43/04; F02D 31/003; F02D 37/02; F02P 5/045; F02P 5/06; F02P 5/142
  See application file for complete search history.

(56) References Cited

U.S. PATENT DOCUMENTS

| | | | |
|---|---|---|---|
| 8,190,349 B2 * | 5/2012 | Takahashi ............. | F02D 41/365 701/111 |
| 2002/0132701 A1 * | 9/2002 | Mabuchi ............... | F02D 31/003 477/110 |
| 2012/0271525 A1 * | 10/2012 | Bucci ...................... | F02D 29/06 701/99 |
| 2016/0319758 A1 * | 11/2016 | Pallett ................... | F02D 41/123 |

FOREIGN PATENT DOCUMENTS

| | | | |
|---|---|---|---|
| JP | 2006299922 A | * | 11/2006 |
| JP | 2010-216419 A | | 9/2010 |

* cited by examiner

*Primary Examiner* — Syed O Hasan
(74) *Attorney, Agent, or Firm* — TROUTMANN PEPPER LOCKE LLP (57) ABSTRACT

An internal combustion engine control apparatus: sets a target intake air amount and a target ignition timing, based on a target torque; predicts an increase in a load of power generation by a generator that is coupled to a power transmission system and generates electric power by being driven by an output torque of an internal combustion engine; when the load of the power generation is predicted to increase, sets an amount of increase correction on the target intake air amount, based on a power generation torque for driving the generator, and sets a retardation amount of the target ignition timing, based on a difference between the target torque and the output torque of the internal combustion engine achieved by the target intake air amount after the increase correction; and returns the target ignition timing to an advance side when a speed of the internal combustion engine suddenly drops.

7 Claims, 7 Drawing Sheets

INTERNAL COMBUSTION ENGINE CONTROL APPARATUS AND INTERNAL COMBUSTION ENGINE CONTROL METHOD

CROSS-REFERENCE TO RELATED APPLICATION

The present application claims priority from Japanese Patent Application No. 2023-166692 filed on Sep. 28, 2023, the entire contents of which are hereby incorporated by reference.

BACKGROUND

The disclosure relates to an internal combustion engine control apparatus and an internal combustion engine control method.

If a speed of an internal combustion engine decreases suddenly while a vehicle is being driven by motive power outputted from the internal combustion engine, the internal combustion engine can stop (stall). In view of this concern, a known technique increases an intake air amount to avoid the stall of the internal combustion engine when the speed of the internal combustion engine falls below a target speed.

For example, Japanese Unexamined Patent Application Publication (JP-A) No. 2010-216419 discloses an internal combustion engine control apparatus whose operation is controlled by an opening of an intake air adjusting valve and an ignition timing. The internal combustion engine control apparatus calculates: a target valve opening that allows an internal combustion engine to achieve a torque including a requested torque acquired as an engine request and a reserve torque (margin torque) added thereto; and a target ignition timing for achievement of the requested torque at the target valve opening. In addition, the internal combustion engine control apparatus acquires an amount of change in the requested torque, corrects the reserve torque to a larger value as the amount of change in the requested torque becomes larger, and restricts execution of the correction when the amount of change in the requested torque is a predetermined large amount of change.

SUMMARY

An aspect of the disclosure provides an internal combustion engine control apparatus configured to control an internal combustion engine. The internal combustion engine includes a throttle valve and an ignition plug. The throttle valve is configured to adjust an intake air amount of the internal combustion engine. The ignition plug is configured to ignite an air-fuel mixture in a cylinder of the internal combustion engine. The internal combustion engine control apparatus includes a setter, a predictor, and a corrector. The setter is configured to set a target intake air amount for the throttle valve and a target ignition timing for the ignition plug, based on a target torque corresponding to a requested acceleration rate of a vehicle including the internal combustion engine. The predictor is configured to predict an increase in a load of power generation by a generator that is coupled to a power transmission system and configured to generate electric power by being driven by an output torque outputted from the internal combustion engine. The power transmission system is configured to transmit motive power from the internal combustion engine to a drive wheel of the vehicle. The corrector is configured to, when the load of the power generation by the generator is predicted to increase, set an increase correction amount for an increase correction on the target intake air amount, based on a power generation torque to be used to drive the generator, and set a retardation amount of the target ignition timing, based on a difference between the target torque and the output torque of the internal combustion engine that is achieved by the target intake air amount after the increase correction, and to return the target ignition timing to an advance side when a sudden drop in a speed of the internal combustion engine occurs.

An aspect of the disclosure provides an internal combustion engine control method configured to control an internal combustion engine. The internal combustion engine includes a throttle valve and an ignition plug. The throttle valve is configured to adjust an intake air amount of the internal combustion engine. The ignition plug is configured to ignite an air-fuel mixture in a cylinder of the internal combustion engine. The internal combustion engine control method includes: setting a target intake air amount for the throttle valve and a target ignition timing for the ignition plug, based on a target torque corresponding to a requested acceleration rate of a vehicle including the internal combustion engine; predicting an increase in a load of power generation by a generator that is coupled to a power transmission system and configured to generate electric power by being driven by an output torque outputted from the internal combustion engine, the power transmission system being configured to transmit motive power from the internal combustion engine to a drive wheel of the vehicle; when the load of the power generation by the generator is predicted to increase, setting an increase correction amount for an increase correction on the target intake air amount, based on a power generation torque to be used to drive the generator, and setting a retardation amount of the target ignition timing, based on a difference between the target torque and the output torque of the internal combustion engine that is achieved by the target intake air amount after the increase correction; and returning the target ignition timing to an advance side when a sudden drop in a speed of the internal combustion engine occurs.

An aspect of the disclosure provides an internal combustion engine control apparatus configured to control an internal combustion engine. The internal combustion engine includes a throttle valve and an ignition plug. The throttle valve is configured to adjust an intake air amount of the internal combustion engine. The ignition plug is configured to ignite an air-fuel mixture in a cylinder of the internal combustion engine. The internal combustion engine control apparatus includes circuitry configured to: set a target intake air amount for the throttle valve and a target ignition timing for the ignition plug, based on a target torque corresponding to a requested acceleration rate of a vehicle including the internal combustion engine; predict an increase in a load of power generation by a generator that is coupled to a power transmission system and configured to generate electric power by being driven by an output torque outputted from the internal combustion engine, the power transmission system being configured to transmit motive power from the internal combustion engine to a drive wheel of the vehicle; when the load of the power generation by the generator is predicted to increase, set an increase correction amount for an increase correction on the target intake air amount, based on a power generation torque to be used to drive the generator, and set a retardation amount of the target ignition timing, based on a difference between the target torque and the output torque of the internal combustion engine that is achieved by the target intake air amount after the increase correction; and return the target ignition timing to an advance side when a sudden drop in a speed of the internal combustion engine occurs.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A control apparatus disclosed in JP-A No. 2010-216419 avoids a failure to achieve a requested torque when an ignition timing is advanced, by adding a margin torque whose value increases in accordance with an amount of change in the requested torque. In the control apparatus disclosed in JP-A No. 2010-216419, however, there is a possibility that an excessive margin torque exceeding the amount of increase in the requested torque is added, resulting in a decrease in combustion efficiency. In addition, if the margin torque is increased, a retardation amount of the ignition timing until the requested torque increases also has to be increased. Thus, the requested torque of the internal combustion engine can fail to be achieved when the retardation amount of the ignition timing is limited, such as during lean combustion control.

It is desirable to provide an internal combustion engine control apparatus and an internal combustion engine control method that make it possible to appropriately set an intake air amount to be subjected to an increase correction in order to suppress a stall of an internal combustion engine.

In the following, some example embodiments of the disclosure are described in detail with reference to the accompanying drawings. Note that the following description is directed to illustrative examples of the disclosure and not to be construed as limiting to the disclosure.

Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First, a configuration example of a vehicle drive system to which an internal combustion engine control apparatus according to an example embodiment of the disclosure is applicable will be described. A vehicle including an internal combustion engine as a driving force source is described below as an example. However, the vehicle may be a hybrid electric vehicle including an internal combustion engine and a drive motor as driving force sources.

Figure 1:
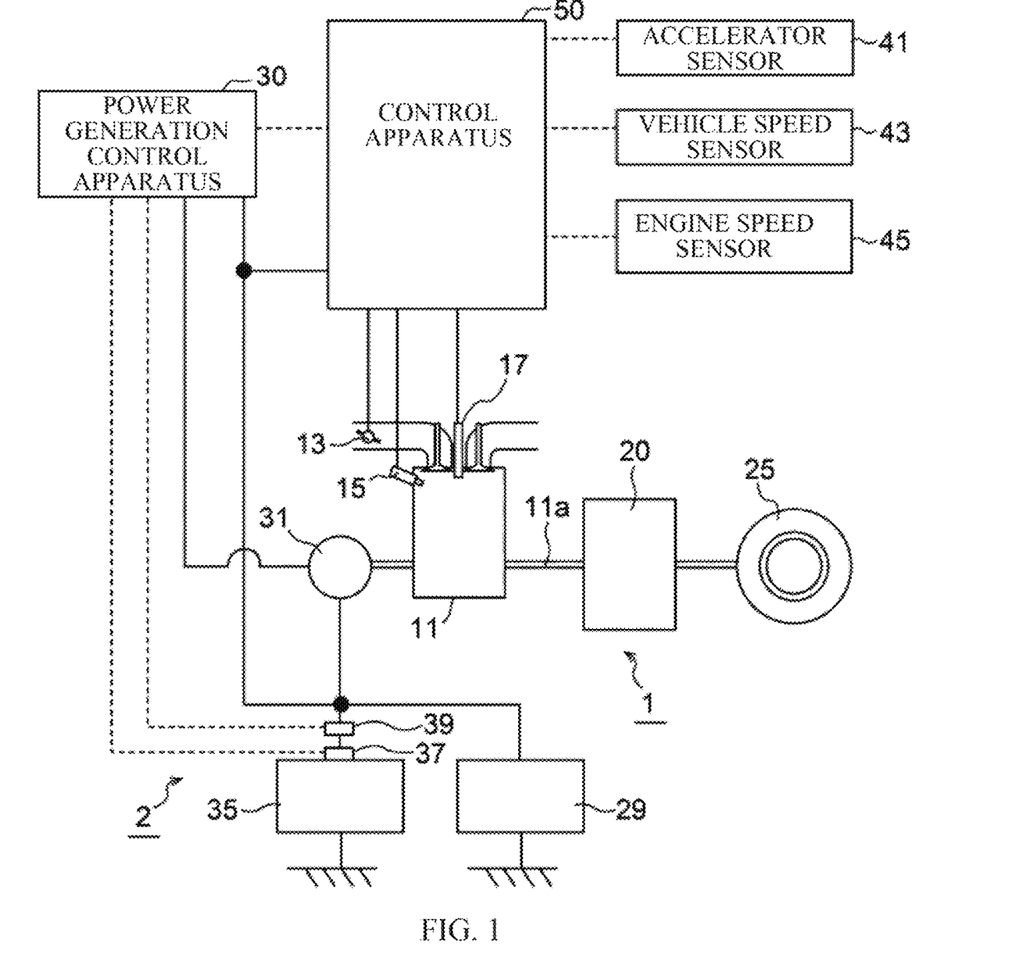
FIG. 1 is a schematic diagram illustrating a configuration example of a vehicle drive system to which an internal combustion engine control apparatus according to one example embodiment of the disclosure is applicable.

FIG. 1 is a schematic diagram illustrating an example of an overall configuration of a drive system 1. The drive system 1 illustrated in FIG. 1 may include an internal combustion engine 11 and a transmission 20. An output torque generated by the internal combustion engine 11 may be transmitted to a drive wheel 25 via a crankshaft 11a and the transmission 20. The transmission 20 may be a continuously variable transmission (CVT) or a stepped transmission. In addition, the drive system 1 may include an unillustrated clutch.

The internal combustion engine 11 may include a throttle valve 13, a fuel injector 15, and an ignition plug 17. The throttle valve 13 may be provided in an intake passage to adjust an intake air amount to be introduced into a cylinder by changing an opening of the throttle valve 13. The fuel injector 15 may inject fuel into the cylinder. The ignition plug 17 may ignite an air-fuel mixture resulting from mixture of intake air and the fuel in the cylinder. Driving of each of the throttle valve 13, the fuel injector 15, and the ignition plug 17 may be controlled by a control apparatus 50. The control apparatus 50 may also be referred to as an "internal combustion engine control apparatus 50". In addition, the internal combustion engine 11 may include components of a known gasoline engine, including an intake valve, an exhaust valve, a piston, and a connecting rod.

An alternator 31 may be coupled to the crankshaft 11a of the internal combustion engine 11, directly or via a pulley mechanism and a power transmission belt. The alternator 31 may be a component of an electric power supply unit 2. The alternator 31 may be a generator that is coupled to a power transmission system and generates electric power by being driven by the output torque outputted from the internal combustion engine 11. The power transmission system transmits motive power from the internal combustion engine 11 to the drive wheel 25. The electric power supply unit 2 may include the alternator 31, a battery 35, a battery voltage sensor 37, a battery current sensor 39, and a power generation control apparatus 30.

The alternator 31 may be a generator that generates electric power by being driven by a rotational torque outputted from the internal combustion engine 11. For example, rotation of the crankshaft 11a of the internal combustion engine 11 may cause a field current to be supplied to field coils of the alternator 31, generating an induced current that is a three-phase AC current. The field current for the field coils may be adjusted through, for example, a regulator. A voltage generated by the alternator 31 may thus be controlled.

The alternator 31 may be configured to not only generate electric power using a power generation torque generated by the internal combustion engine 11, but also generate electric power (regenerative power generation) using a braking torque inputted from the drive wheel 25 side. The alternator 31 may include a rectifier. The alternator 31 may convert the generated AC current into a DC current and output the DC current. The electric power generated by the alternator 31 may be charged into the battery 35 and consumed by an electric power load 29. The electric power load 29 may include electric control elements and auxiliary equipment of the internal combustion engine 11.

The battery 35 may be coupled to the alternator 31 and charged with the generated electric power generated by the alternator 31. In addition, when electric power is desired by the internal combustion engine 11 or the electric power load 29, for example, in a case of supplying electric power to a starter motor when starting the internal combustion engine 11, the battery 35 may supply accumulated electric power to the internal combustion engine 11 or the electric power load 29.

The battery current sensor 39 may measure a current that is charged and discharged into and from the battery 35, and transmit a sensor signal corresponding to the current value to the power generation control apparatus 30. The battery voltage sensor 37 may measure a terminal voltage of the battery 35, and transmit a sensor signal corresponding to the voltage value to the power generation control apparatus 30.

The power generation control apparatus 30 may include, for example, a processor and a storage element. Examples of the processor may include a central processing unit (CPU). Examples of the storage element may include a random-access memory (RAM) and a read-only memory (ROM). The power generation control apparatus 30 may control the electric power supply unit 2 by the processor executing a computer program. For example, the power generation control apparatus 30 may perform a process of controlling power generation by the alternator 31 to keep a state of charge (SOC) of the battery 35 at a predetermined target state of charge, by supplying electric power from the battery 35 to the internal combustion engine 11 and the electric power load 29.

The power generation control apparatus 30 may determine the SOC of the battery 35 based on a battery voltage. The power generation control apparatus 30 may adjust an excitation current to be supplied to the regulator in accordance with the battery voltage, to control the electric power generated by the alternator 31. When a current is consumed by the internal combustion engine 11 or the electric power load 29, the battery voltage decreases. Accordingly, the power generation control apparatus 30 may cause the alternator 31 to generate electric power, which results in an increase in a value of a current generated by the alternator 31. The power generation control apparatus 30 may transmit data indicating at least the battery voltage and the excitation current and the field current of the alternator 31 to the control apparatus 50 for the internal combustion engine 11.

Now, the control apparatus 50 that controls the internal combustion engine 11 will be described.

The control apparatus 50 may set a control target of the internal combustion engine 11 based on the data transmitted from the various sensors, and control the driving of the internal combustion engine 11 based on the set control target. The control apparatus 50 may output control signals to, for example, the throttle valve 13, the fuel injector 15, and the ignition plug 17, to control the output torque and an engine speed.

The control apparatus 50 may serve as an apparatus that controls the driving of the internal combustion engine 11 when a processor such as one or more CPUs executes a computer program. The computer program may be a computer program that causes the processor to execute later-described operation to be performed by the control apparatus 50. The computer program to be executed by the processor may be recorded in a recording medium serving as a storage (memory) provided in the control apparatus 50. Alternatively, the computer program to be executed by the processor may be recorded in a recording medium built in the control apparatus 50 or any recording medium externally attachable to the control apparatus 50.

The recording medium that records the computer program may include: a magnetic medium such as a hard disk drive (HDD), a floppy disk, or a magnetic tape; an optical recording medium such as a compact disk read-only memory (CD-ROM), a digital versatile disk (DVD), or Blu-ray (registered trademark); a magneto-optical medium such as a floptical disk; a storage element such as a RAM or a ROM; a flash memory such as a universal serial bus (USB) memory or a solid state drive (SSD); or any other medium that is able to store programs.

Part or all of the control apparatus 50 may include updatable software such as firmware, or may be, for example, a program module executed by a command from, for example, a CPU.

The control apparatus 50 may be configured to acquire sensor signals from an accelerator sensor 41, a vehicle speed sensor 43, and an engine speed sensor 45. The accelerator sensor 41 may detect an operation amount of an accelerator pedal. The vehicle speed sensor 43 may detect a vehicle speed. The engine speed sensor 45 may detect the engine speed that is a rotational speed of the crankshaft 11a. In addition, the control apparatus 50 may be communicably coupled to the power generation control apparatus 30. The control apparatus 50 may be configured to acquire the data indicating the battery voltage and the excitation current and the field current of the alternator 31 from the power generation control apparatus 30.

Next, a configuration of the internal combustion engine control apparatus 50 according to the example embodiment will be described in detail.

Figure 2:
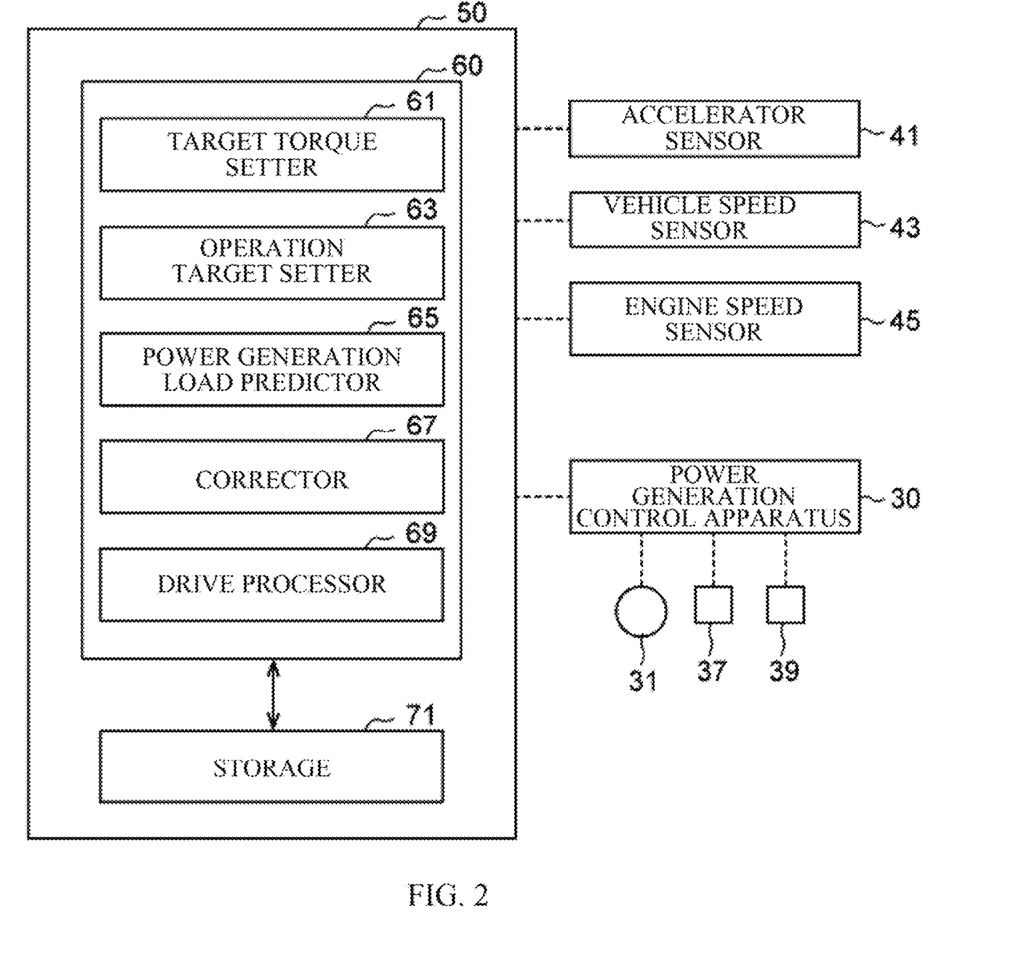
FIG. 2 is a block diagram illustrating a configuration example of the internal combustion engine control apparatus according to one example embodiment.

FIG. 2 is an explanatory diagram illustrating the configuration of the control apparatus 50 illustrated in FIG. 1. The control apparatus 50 may include a processing unit 60 and a storage 71. The processing unit 60 may include one or more processors such as CPUs. The storage 71 may be configured to communicate with the processing unit 60. The storage 71 may store data including, for example, a program to be executed by the processing unit 60, parameters to be used for various calculations, detection data, and a calculation result. A part of the storage 71 may be used as a work area of the processing unit 60.

The control apparatus 50 may be configured to acquire the sensor signals outputted from the accelerator sensor 41, the vehicle speed sensor 43, and the engine speed sensor 45. The various sensors may be directly coupled to the control apparatus 50 in the illustrated example. Alternatively, the control apparatus 50 may acquire data indicated by the sensor signals of the various sensors from another control apparatus via an unillustrated in-vehicle network. In addition, the control apparatus 50 may be coupled to the power generation control apparatus 30 directly or via an unillustrated in-vehicle network such as a controller area network (CAN).

The processing unit 60 may include a target torque setter 61, an operation target setter 63, a power generation load predictor 65, a corrector 67, and a drive processor 69. These components may be implemented by the processor executing computer programs. Note that a part of the target torque setter 61, the operation target setter 63, the power generation load predictor 65, the corrector 67, and the drive processor 69 may include hardware such as an analogue circuit. In one embodiment, the operation target setter 63 may serve as a "setter". In one embodiment, the power generation load predictor 65 may serve as a "predictor".

The target torque setter 61 may set a target torque that is a target value of the output torque outputted from the internal combustion engine 11. The target torque setter 61 may set, as the target torque, the sum of a driving torque to be transmitted to the drive wheel 25 to drive the vehicle and the power generation torque to be used for power generation by the alternator 31. For example, the target torque setter 61 may refer to a torque map stored in the storage 71 in advance, and calculate the driving torque based on an accelerator position and the engine speed. The target torque setter 61 may calculate the power generation torque based on the excitation current and the engine speed, which determine the electric power generated by the alternator 31.

When there is another drive element that uses the output torque of the internal combustion engine 11, the target torque setter 61 may set the target torque by further adding a torque to be used by the other drive element.

The operation target setter 63 may set a target intake air amount, a target fuel injection amount, and a target ignition timing, based on the target torque set by the target torque setter 61. For example, the operation target setter 63 may set the target intake air amount, the target fuel injection amount, and the target ignition timing by referring to an intake air amount map, an injection amount map, and an ignition timing map stored in the storage 71 in advance.

The target intake air amount may be a target value of the intake air amount to be introduced into the cylinder of the internal combustion engine 11. The target intake air amount may be set in proportion to a magnitude of the target torque. The target fuel injection amount may be a target value of a fuel injection amount to be injected and supplied into the cylinder by the fuel injector 15. The target fuel injection amount may basically be set in accordance with the target intake air amount, to set a ratio between the fuel and the air of the air-fuel mixture to a constant ratio.

The target ignition timing may be a target value of a timing of igniting the air-fuel mixture in the cylinder. For example, the ignition timing further on a retardation side, with respect to a top dead center of the piston of the internal combustion engine 11, results in lower combustion efficiency of the air-fuel mixture. "Retarding the ignition timing" may refer to delaying the ignition timing with respect to a reference ignition timing. Conversely, "advancing the ignition timing" may refer to making the ignition timing earlier with respect to a reference ignition timing.

The power generation load predictor 65 predicts an increase in a load of power generation by the alternator 31. In the example embodiment, the power generation load predictor 65 may predict in advance that the load of power generation will increase when a decrease rate of the battery voltage is equal to or greater than a predetermined first threshold. As described above, the power generation control apparatus 30 may control the power generation by the alternator 31 to keep the SOC of the battery 35 at the predetermined target state of charge. While an amount of discharge from the battery 35 is small and the decrease rate of the battery voltage is low, the load of the power generation by the alternator 31 is relatively small, and the internal combustion engine 11 is less likely to stall.

In contrast, when the amount of discharge from the battery 35 becomes excessive and the decrease rate of the battery voltage increases, the load of the power generation by the alternator 31 increases, which results in a higher possibility that the internal combustion engine 11 stalls. The power generation load predictor 65 may predict an increase in the load of the power generation by the alternator 31 before the actual increase in the load of power generation.

When the load of the power generation by the alternator 31 is predicted to increase, the corrector 67 sets an increase correction amount of the target intake air amount, based on the power generation torque to be used for power generation by the alternator 31, and sets a retardation amount of the target ignition timing, based on a difference between the target torque and the output torque of the internal combustion engine 11 that is achieved by the intake air amount after an increase correction. In addition, the corrector 67 performs a process of returning the target ignition timing to an advance side when a sudden drop in the speed of the internal combustion engine 11 occurs.

After an increase in the load of the power generation by the alternator 31 is predicted, the corrector 67 may keep the output torque of the internal combustion engine 11 at the target torque by delaying the ignition timing while increasing the intake air amount, until the engine speed suddenly drops. In addition, the corrector 67 returns the ignition timing to the advance side when the engine speed suddenly drops. At this time, because the intake air amount has already been increased, returning the ignition timing to the advance side makes it possible to improve responsiveness of an increase in the output torque of the internal combustion engine 11.

Because the ratio between the air and the fuel in the air-fuel mixture may be a constant ratio, the increase correction on the target intake air amount may result in an increase correction on the target fuel injection amount.

The drive processor 69 may control the driving of the throttle valve 13, the fuel injector 15, and the ignition plug 17 to control the internal combustion engine 11, based on the target intake air amount, the target fuel injection amount, and the target ignition timing set by the operation target setter 63 and the corrector 67. This controls the output torque outputted from the internal combustion engine 11 and the engine speed.

For example, the drive processor 69 may set a target opening of the throttle valve 13 based on the target intake air amount and the engine speed, and rotationally drive the throttle valve 13. The drive processor 69 may set a driving duty ratio of the fuel injector 15 based on the target fuel injection amount, and control a current to be supplied to the fuel injector 15. The drive processor 69 may supply a current to the ignition plug 17 in accordance with the target ignition timing.

The configuration example of the internal combustion engine control apparatus 50 has been described above. Now, an operation example of the internal combustion engine control apparatus 50 will be described.

Figure 3:
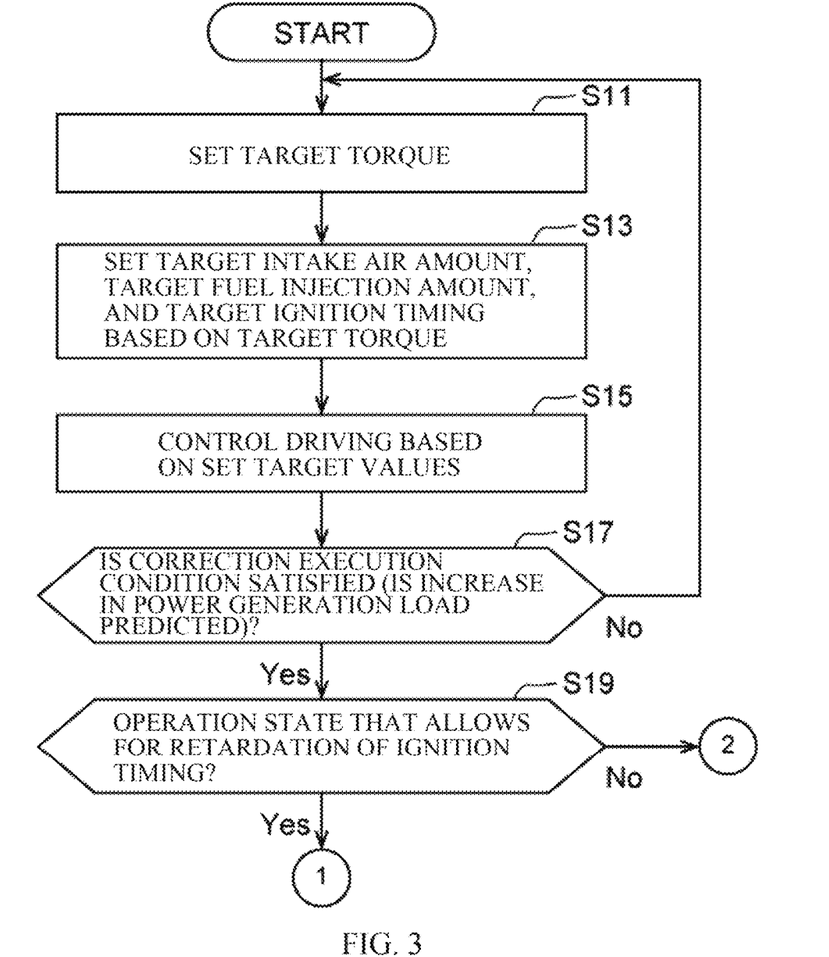
FIG. 3 is a flowchart illustrating an example of an internal combustion engine control method according to one example embodiment.
Figure 4:
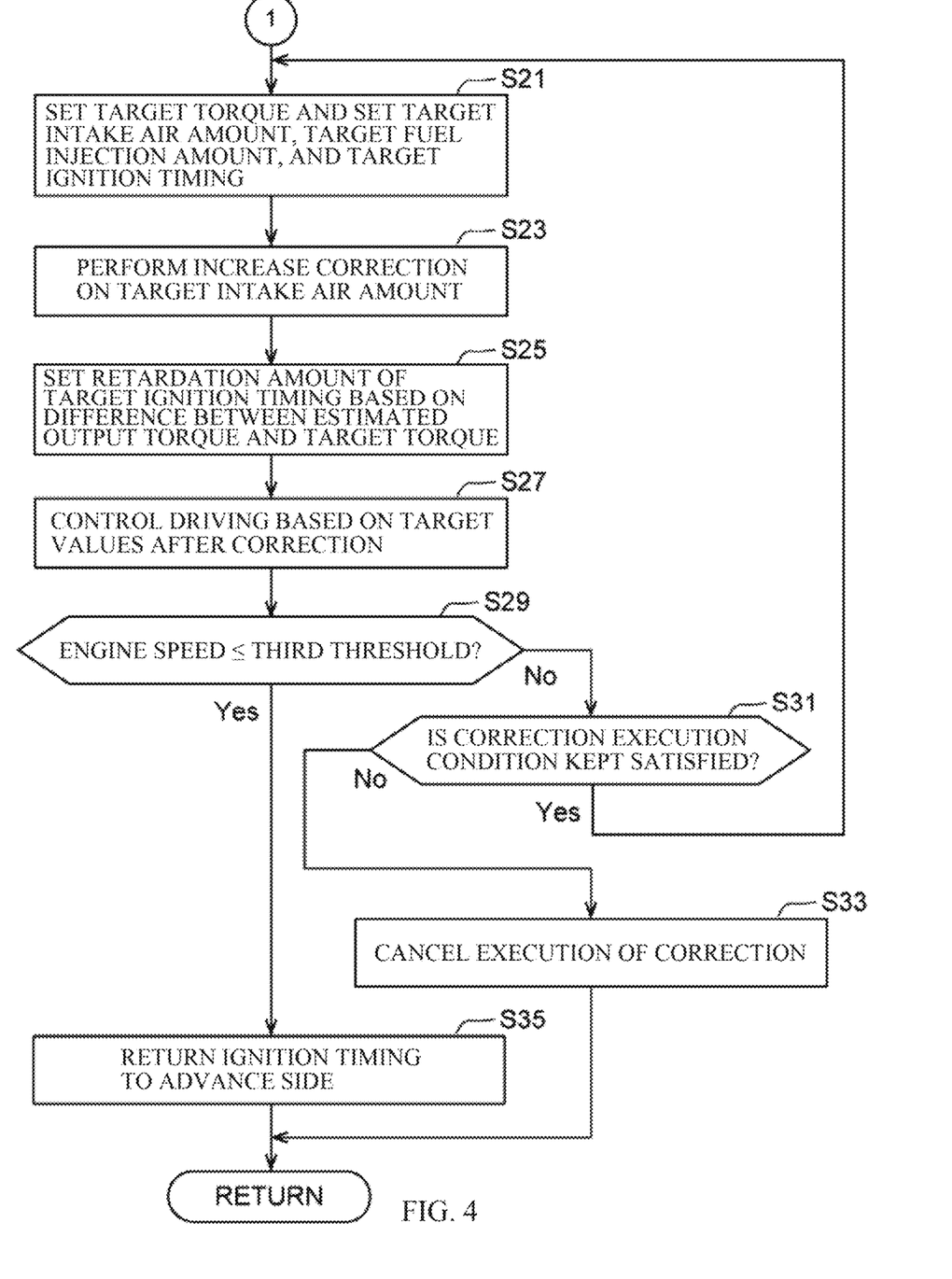
FIG. 4 is a flowchart illustrating the example of the internal combustion engine control method according to one example embodiment.
Figure 5:
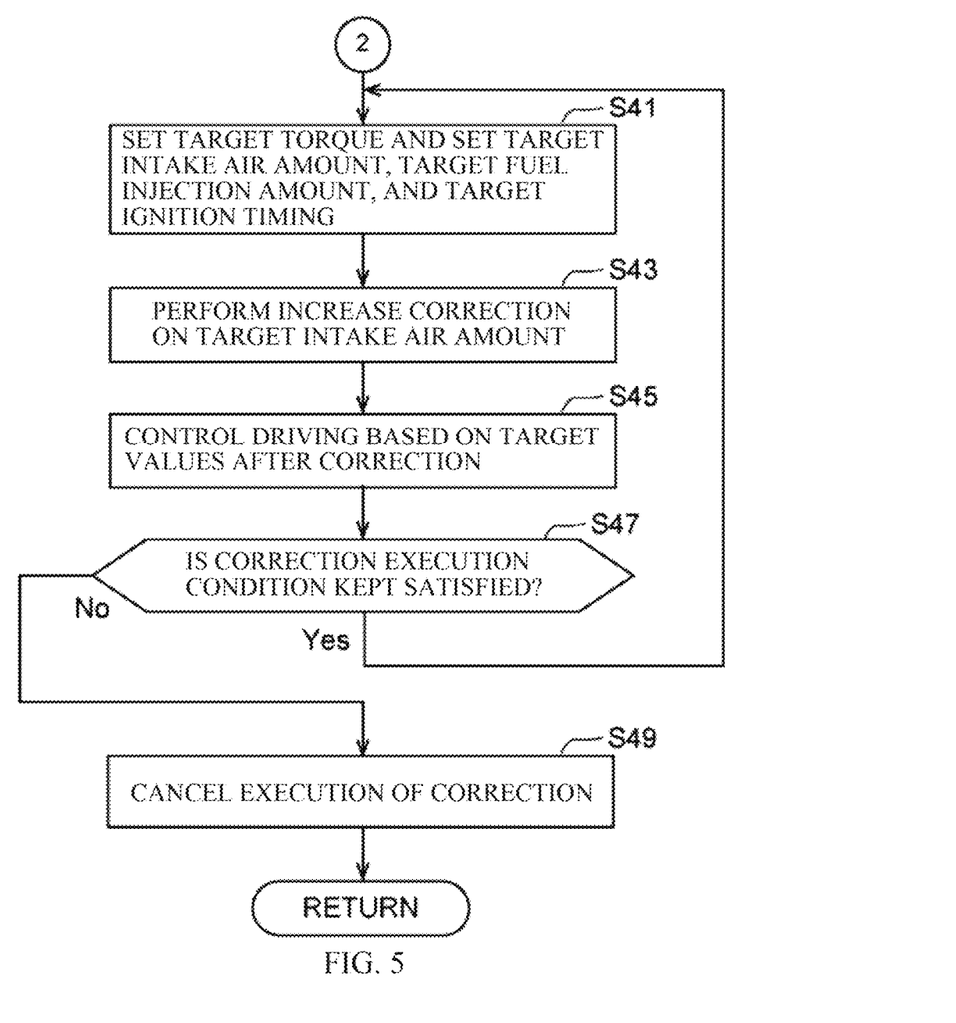
FIG. 5 is a flowchart illustrating the example of the internal combustion engine control method according to one example embodiment.

FIGS. 3 to 5 are flowcharts illustrating an example of processing operation that is performed by the control apparatus 50. The flowcharts illustrated in FIGS. 3 to 5 may be constantly executed while the drive system 1 is in operation.

First, the target torque setter 61 may set the target torque of the internal combustion engine 11 (step S11). For example, the target torque setter 61 may acquire the sensor signal of the accelerator sensor 41 and the sensor signal of the engine speed sensor 45, and calculate the driving torque based on the accelerator position and the engine speed by referring to the torque map. During automated driving in which the vehicle automatically controls an acceleration rate using a computer, data regarding a requested acceleration rate set by the computer may be used instead of data regarding the accelerator position. In addition, the target torque setter 61 may calculate the power generation torque based on the excitation current of the alternator 31 transmitted from the power generation control apparatus 30 and the engine speed. The target torque setter 61 may set the sum of the driving torque and the power generation torque as the target torque.

Thereafter, the operation target setter 63 may set the target intake air amount, the target fuel injection amount, and the target ignition timing, based on the target torque set by the target torque setter 61 (step S13). For example, the operation target setter 63 may acquire data regarding the target torque and the engine speed, and respectively set the target intake air amount, the target fuel injection amount, and the target ignition timing based on the target torque and the engine speed by referring to the intake air amount map, the injection volume map, and the ignition timing map.

Thereafter, the drive processor 69 may control the driving of the throttle valve 13, the fuel injector 15, and the ignition plug 17 based on the set target intake air amount, target fuel injection amount, and target ignition timing (step S15). For example, the drive processor 69 may set the target opening of the throttle valve 13 based on the target intake air amount and the engine speed, and rotationally drive the throttle valve 13. The drive processor 69 may set the driving duty ratio of the fuel injector 15 based on the target fuel injection amount, and control a current to be supplied to the fuel injector 15. The drive processor 69 may supply a current to the ignition plug 17 in accordance with the target ignition timing.

Thereafter, the power generation load predictor 65 may determine whether a correction execution condition is satisfied (step S17). The process of determining whether the correction execution condition is satisfied may correspond to a process of determining whether an increase in the load of the power generation by the alternator 31 is predicted.

Figure 6:
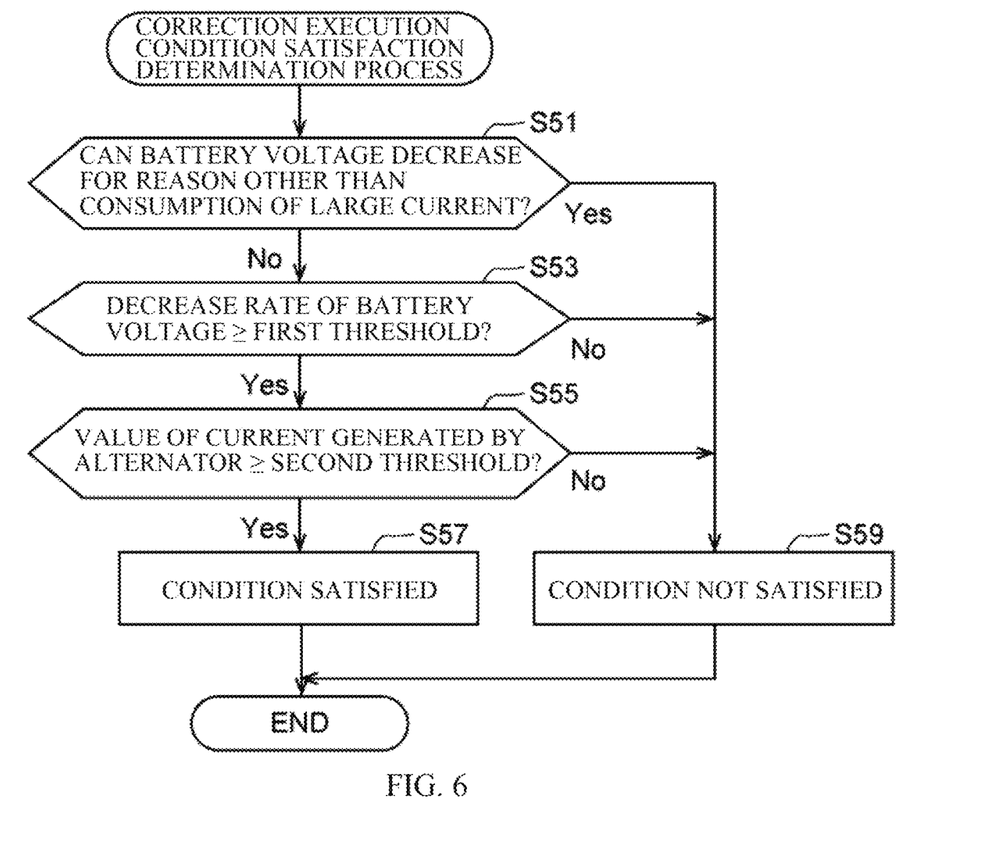
FIG. 6 is a flowchart illustrating a correction execution condition satisfaction determination process that is performed by the internal combustion engine control apparatus according to one example embodiment.

FIG. 6 is a flowchart illustrating a correction execution condition satisfaction determination process.

The power generation load predictor 65 may determine whether the battery voltage can decrease for a reason other than consumption of a large current equal to or greater than a predetermined reference (step S51). The determination process of step S51 may be a process of determining whether no abnormality has occurred in the electric power supply unit 2. The abnormality in the electric power supply unit 2 may be, for example, a malfunction or deterioration of the battery 35 or a malfunction of the alternator 31.

When it is not determined that the battery voltage can decrease for a reason other than consumption of a large current equal to or greater than the predetermined reference (S51/No), the power generation load predictor 65 may determine whether the decrease rate of the battery voltage is equal to or greater than the predetermined first threshold, based on the data regarding the battery voltage acquired from the power generation control apparatus 30 (step S53). The determination process of step S51 may be a process of determining that the decrease rate of the battery voltage is high and the load of the power generation becomes excessive in order to keep the SOC of the battery 35 at the predetermined target state of charge. The first threshold may be set to any appropriate value based on this viewpoint. For example, assume that the battery voltage is acquired in a predetermined sampling cycle ($\Delta t$). The power generation load predictor 65 may determine that the decrease rate of the battery voltage is equal to or greater than the predetermined first threshold when a difference ($\Delta V$) obtained by subtracting the present value of the battery voltage from the previous value of the battery voltage is equal to or less than a predetermined threshold ($\Delta V\_thr$). Note that the threshold $\Delta V\_thr$ may indicate a negative value.

When it is determined that the decrease rate of the battery voltage is equal to or greater than the predetermined first threshold (S53/Yes), the power generation load predictor 65 may determine whether the value of the current generated by the alternator 31 is equal to or greater than a predetermined second threshold, based on the excitation current of the alternator 31 acquired from the power generation control apparatus 30 (step S55). The value of the current generated by the alternator 31 decreases when the battery voltage decreases with a decrease in a target voltage of the battery 35. Accordingly, the determination process of step S55 may be a process of determining such a situation to prevent unnecessary correction from being executed. The second threshold may be set to any appropriate value based on this viewpoint.

When it is determined that the value of the current generated by the alternator 31 is equal to or greater than the predetermined second threshold (S55/Yes), i.e., when the determination made in step S51 is No and the determinations made in steps S53 and S55 are Yes, the power generation load predictor 65 may determine that the correction execution condition is satisfied, because the load of the power generation by the alternator 31 can increase (step S57). In contrast, when the determination made in step S51 is Yes or when the determination made in one of steps S53 and S55 is No (S51/Yes, S53/No, or S55/No), the power generation load predictor 65 may determine that the correction execution condition is not satisfied, because it seems that the load of the power generation by the alternator 31 is unlikely to increase (step S59).

Returning to FIG. 3, when the power generation load predictor 65 does not determine in step S17 that the correction execution condition is satisfied (S17/No), the process may return to step S11, and the control of the internal combustion engine 11 may be continued. In contrast, when the power generation load predictor 65 determines that the correction execution condition is satisfied (S17/Yes), the corrector 67 may determine whether an operation state of the internal combustion engine 11 is an operation state that allows for retardation of the ignition timing (step S19). For example, when the internal combustion engine 11 is in a lean combustion control state, retarding the ignition timing can cause the combustion efficiency to excessively decrease, resulting in misfire of the internal combustion engine 11. Thus, step S19 may be a process of determining whether the internal combustion engine 11 is in an operation state that withstands retardation of the ignition timing, and a predetermined condition may be set in addition to the above-described lean combustion control state.

When the corrector 67 determines that the operation state of the internal combustion engine 11 is an operation state that allows for retardation of the ignition timing (S19/Yes), the process may proceed to step S21. In contrast, when the corrector 67 does not determine that the operation state of the internal combustion engine 11 is an operation state that allows for retardation of the ignition timing (S19/No), the process may proceed to step S41.

When the corrector 67 determines that the operation state of the internal combustion engine 11 is an operation state that allows for retardation of the ignition timing (S19/Yes), the target torque setter 61 may set the target torque of the internal combustion engine 11, and the operation target setter 63 may set the target intake air amount, the target fuel injection amount, and the target ignition timing (step S21), as in steps S11 and S13 described above.

Thereafter, the corrector 67 may perform an increase correction on the target intake air amount (step S23). In the example embodiment, the corrector 67 may calculate the increase correction amount using an intake air amount compensation map in which the increase correction amount of the intake air amount is set in accordance with a rotational speed of the alternator 31, the field current of the alternator 31, and the battery voltage. The rotational speed of the alternator 31 may be detected by a rotational speed sensor provided in the alternator 31, or may be calculated by multiplying the engine speed by a value of a ratio between the rotational speed of the crankshaft 11a and the rotational speed of the alternator 31. Note that the increase correction on the target intake air amount may result in an increase correction on the target fuel injection amount.

Thereafter, the corrector 67 may set the retardation amount of the target ignition timing, based on the difference between the estimated output torque that is estimated to be outputted with the target intake air amount after the increase correction and the target torque that is set in step S21 (step S25). When the intake air amount is subjected to the increase correction, the output torque of the internal combustion engine 11 increases, causing an excessive torque exceeding the target torque to be outputted. Accordingly, the retardation amount of the ignition timing that makes it possible to suppress the excessive torque may be set. In the example embodiment, the corrector 67 may calculate the retardation amount of the ignition timing using an ignition timing correction map in which the retardation amount of the ignition timing is set in accordance with a discrepancy between the torque outputtable with the increased intake air amount and the target torque.

Thereafter, the drive processor 69 may control the driving of the throttle valve 13, the fuel injector 15, and the ignition plug 17, based on the target intake air amount, the target fuel injection amount, and the target ignition timing after the correction, as in step S15 (step S27). Thereafter, the corrector 67 may determine whether the engine speed is equal to or less than a predetermined third threshold, based on the sensor signal outputted from the engine speed sensor 45 (step S29). The determination process of step S29 may be a process of determining whether the engine speed has actually decreased to an engine speed at which a stall of the internal combustion engine 11 can occur. If the third threshold is too small, the internal combustion engine 11 can stall before the torque outputted from the internal combustion engine 11 is increased. The third threshold may be set to any appropriate value based on this viewpoint.

When the corrector 67 does not determine that the engine speed is equal to or less than the predetermined third threshold (S29/No), the power generation load predictor 65 may determine whether the correction execution condition is kept satisfied as in step S17 (step S31). When the power generation load predictor 65 determines that the correction execution condition is kept satisfied (S31/Yes), the process may return to step S21, the target intake air amount, the target fuel injection amount, and the target ignition timing may be corrected, and the driving of the throttle valve 13, the fuel injector 15, and the ignition plug 17 may be controlled.

In contrast, when the power generation load predictor 65 does not determine that the correction execution condition is kept satisfied (S31/No), the corrector 67 may cancel the execution of the correction (step S33). Thus, the increase correction on the intake air amount may be stopped and the ignition timing may be returned to the ignition timing corresponding to the ignition timing map. At this time, the ignition timing may be gradually changed to the advance side at a predetermined change rate, because there is a time difference before the intake air amount returns to the state before the increase. This makes it possible to suppress a rise in the engine speed due to a sudden increase in the output torque of the internal combustion engine 11.

In contrast, when the corrector 67 determines that the engine speed is equal to or less than the predetermined third threshold (S29/Yes), the corrector 67 may return the ignition timing to the advance side (step S35). Thus, the ignition timing may be advanced with the intake air amount subjected to the increase correction, resulting in an increase in the output torque of the internal combustion engine 11. This makes it possible to suppress a stall of the internal combustion engine 11 due to a sudden drop in the engine speed caused by an increase in the load of the power generation by the alternator 31. At this time, it is possible to suppress a rise in the engine speed by gradually changing the ignition timing to the advance side at a predetermined change rate.

After the ignition timing is returned to the advance side, the process may return to step S11, and the driving of the internal combustion engine 11 may be controlled in accordance with the target torque corresponding to the requested acceleration rate or the target torque for keeping an idle speed.

In contrast, when the corrector 67 does not determine in step S19 that the operation state of the internal combustion engine 11 is an operation state that allows for retardation of the ignition timing (S19/No), the target torque setter 61 may set the target torque of the internal combustion engine 11, and the operation target setter 63 may set the target intake air amount, the target fuel injection amount, and the target ignition timing, as in step S21 (step S41). Thereafter, the corrector 67 may perform an increase correction on the target intake air amount as in step S23 (step S43). Thereafter, the drive processor 69 may control the driving of the throttle valve 13, the fuel injector 15, and the ignition plug 17, based on the target intake air amount, the target fuel injection amount, and the target ignition timing after the correction, as in step S15 (step S45). In this case, the corrector 67 may not correct the ignition timing, because the internal combustion engine 11 is not in an operation state that withstands retardation of the ignition timing. However, because the intake air amount is subjected to the increase correction, a sudden drop in the engine speed is suppressed even if the load of the power generation by the alternator 31 increases, which makes it possible to suppress the stall of the internal combustion engine 11.

Thereafter, the power generation load predictor 65 may determine whether the correction execution condition is kept satisfied as in step S17 (step S47). When the power generation load predictor 65 determines that the correction execution condition is kept satisfied (S47/Yes), the process may return to step S41, the target intake air amount and the target fuel injection amount may be corrected, and the driving of the throttle valve 13, the fuel injector 15, and the ignition plug 17 may be controlled.

In contrast, when the power generation load predictor 65 does not determine that the correction execution condition is kept satisfied (S47/No), the corrector 67 may cancel the execution of the correction (step S49). Thereafter, the process may return to step S11, and the driving of the internal combustion engine 11 may be controlled in accordance with the target torque corresponding to the requested acceleration rate or the target torque for keeping the idle speed.

Now, workings of at least one embodiment of the disclosure will be described with reference to FIG. 7.

Figure 7:
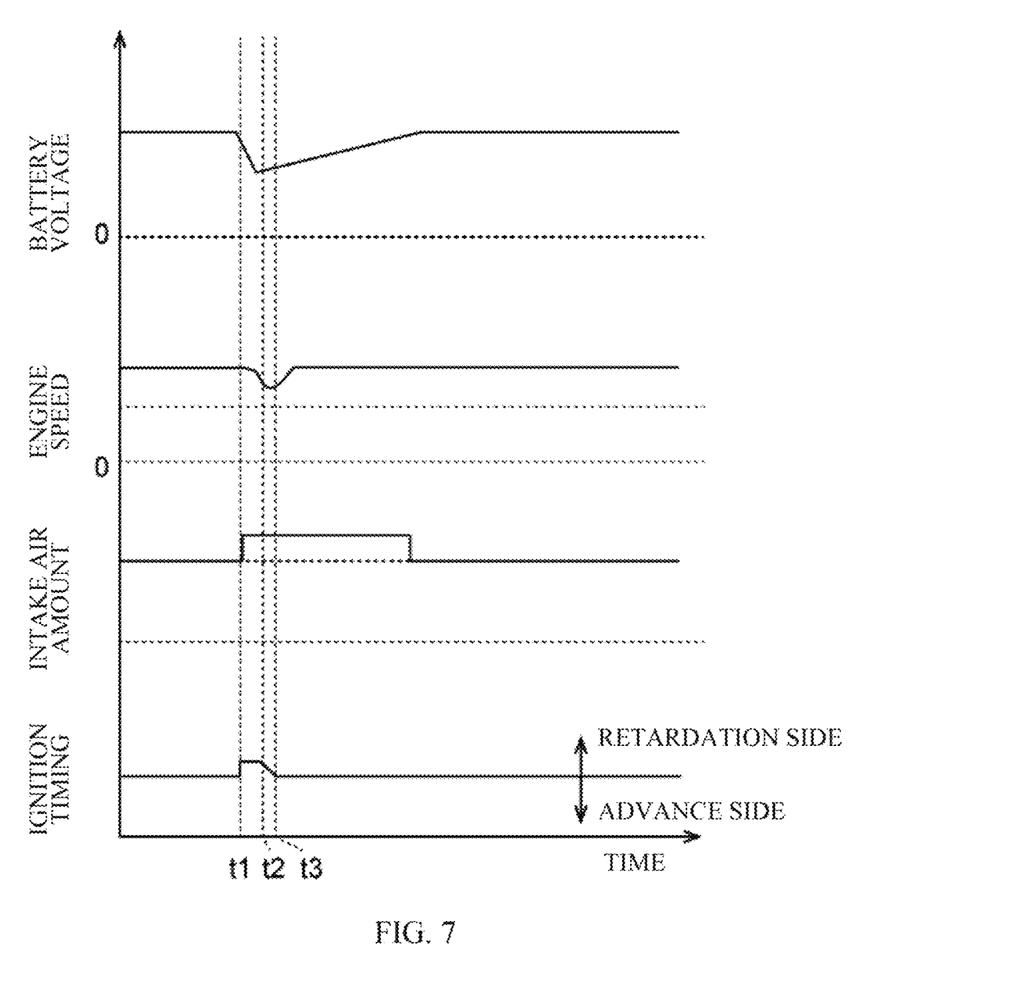
FIG. 7 is an explanatory diagram illustrating workings of at least one embodiment of the disclosure.

FIG. 7 illustrates the battery voltage, the engine speed, the intake air amount, and the ignition timing when the battery voltage suddenly drops due to consumption of a large current.

Assume a state in which power generation by the alternator 31 is controlled to keep the SOC of the battery 35 at the predetermined target state of charge and the battery voltage is stabilized around a predetermined value. From this state, when the control apparatus 50 determines that the correction execution condition is satisfied at time t1, the control apparatus 50 may perform an increase correction on the intake air amount and retard the ignition timing. At this time, a rise in the engine speed does not occur because the output torque of the internal combustion engine 11 does not increase. Thereafter, when the engine speed suddenly drops at time t2, the control apparatus 50 may return the ignition timing to the advance side in a period from time t2 to time t3, while keeping the intake air amount subjected to the increase correction. This increases the output torque of the internal combustion engine 11, resolves the decrease in the engine speed, and avoids the stall of the internal combustion engine 11.

As described above, when the load of the power generation by the alternator 31 is predicted to increase, the internal combustion engine control apparatus 50 according to the example embodiment prepares for a sudden drop in the engine speed of the internal combustion engine 11 while keeping the output torque of the internal combustion engine 11 at the target torque by increasing the intake air amount and retarding the ignition timing in advance. When a sudden drop in the engine speed occurs, the control apparatus 50 returns the ignition timing to the advance side to quickly increase the output torque of the internal combustion engine 11. This reduces the possibility that the engine speed decreases with an increase in the load of the power generation by the alternator 31, making it possible to avoid the stall of the internal combustion engine 11. Thus, at least one embodiment of the disclosure makes it possible to appropriately set the intake air amount to be subjected to an increase correction in order to suppress the stall of the internal combustion engine 11.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the operation target setter 63, the power generation load predictor 65, and the corrector 67 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the operation target setter 63, the power generation load predictor 65, and the corrector 67. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the operation target setter 63, the power generation load predictor 65, and the corrector 67 illustrated in FIG. 2.

The invention claimed is:

1. An internal combustion engine control apparatus configured to control an internal combustion engine, the internal combustion engine comprising a throttle valve and an ignition plug, the throttle valve being configured to adjust an intake air amount of the internal combustion engine, the ignition plug being configured to ignite an air-fuel mixture in a cylinder of the internal combustion engine, the internal combustion engine control apparatus comprising:
   one or more processors; and
   one or more memories storing instructions causing the one or more processors to:
      set a target intake air amount for the throttle valve and a target ignition timing for the ignition plug, based on a target torque corresponding to a requested acceleration rate of a vehicle comprising the internal combustion engine;
      predict an increase in a load of power generation by a generator that is coupled to a power transmission system and configured to generate electric power by being driven by an output torque outputted from the internal combustion engine, the power transmission system being configured to transmit motive power from the internal combustion engine to a drive wheel of the vehicle; and
      when the load of the power generation by the generator is predicted to increase, set an increase correction amount for an increase correction on the target intake air amount, based on a power generation torque to be used to drive the generator, and set a retardation amount of the target ignition timing, based on a difference between the target torque and the output torque of the internal combustion engine that is achieved by the target intake air amount after the increase correction, and return the target ignition timing to an advance side when a sudden drop in a speed of the internal combustion engine occurs,
   wherein, the one or more processors are configured to predict that the load of the power generation by the generator is to increase when: a voltage of a battery configured to be charged with a current generated by the generator is unlikely to decrease for a reason other than consumption of a current equal to or greater than a predetermined reference; a decrease rate of the voltage of the battery is equal to or greater than a predetermined first threshold; and the current generated by the generator is equal to or greater than a predetermined second threshold.

2. The internal combustion engine control apparatus according to claim 1, wherein the one or more processors are configured to calculate the power generation torque, based on a rotational speed of the generator, a current generated by the generator, and a voltage of a battery configured to be charged with the current generated by the generator.

3. The internal combustion engine control apparatus according to claim 1, wherein the one or more processors are configured to
further determine whether an operation state of the internal combustion engine is an operation state that allows for retardation of the target ignition timing, when the load of the power generation by the generator is predicted to increase, and
perform the increase correction on the target intake air amount, without setting the retardation amount of the target ignition timing, when the one or more processors determines that the operation state of the internal combustion engine is not the operation state that allows for the retardation of the target ignition timing.

4. An internal combustion engine control method configured to control an internal combustion engine, the internal combustion engine comprising a throttle valve and an ignition plug, the throttle valve being configured to adjust an intake air amount of the internal combustion engine, the ignition plug being configured to ignite an air-fuel mixture in a cylinder of the internal combustion engine, the internal combustion engine control method comprising:
setting a target intake air amount for the throttle valve and a target ignition timing for the ignition plug, based on a target torque corresponding to a requested acceleration rate of a vehicle comprising the internal combustion engine;
predicting an increase in a load of power generation by a generator that is coupled to a power transmission system and configured to generate electric power by being driven by an output torque outputted from the internal combustion engine, the power transmission system being configured to transmit motive power from the internal combustion engine to a drive wheel of the vehicle;
when the load of the power generation by the generator is predicted to increase, setting an increase correction amount for an increase correction on the target intake air amount, based on a power generation torque to be used to drive the generator, and setting a retardation amount of the target ignition timing, based on a difference between the target torque and the output torque of the internal combustion engine that is achieved by the target intake air amount after the increase correction;
determining whether a speed of the internal combustion engine is equal to or less than a predetermined stall threshold, the predetermined stall threshold indicating a possibility of an occurrence of a stall of the internal combustion engine; and
returning the target ignition timing to an advance side in response to determining that the speed of the internal combustion engine is equal to or less than the predetermined stall threshold.

5. An internal combustion engine control apparatus configured to control an internal combustion engine, the internal combustion engine comprising a throttle valve and an ignition plug, the throttle valve being configured to adjust an intake air amount of the internal combustion engine, the ignition plug being configured to ignite an air-fuel mixture in a cylinder of the internal combustion engine, the internal combustion engine control apparatus comprising:
a circuitry configured to:
set a target intake air amount for the throttle valve and a target ignition timing for the ignition plug, based on a target torque corresponding to a requested acceleration rate of a vehicle comprising the internal combustion engine;
predict an increase in a load of power generation by a generator that is coupled to a power transmission system and configured to generate electric power by being driven by an output torque outputted from the internal combustion engine, the power transmission system being configured to transmit motive power from the internal combustion engine to a drive wheel of the vehicle;
when the load of the power generation by the generator is predicted to increase, set an increase correction amount for an increase correction on the target intake air amount, based on a power generation torque to be used to drive the generator, and set a retardation amount of the target ignition timing, based on a difference between the target torque and the output torque of the internal combustion engine that is achieved by the target intake air amount after the increase correction;
determine whether a speed of the internal combustion engine is equal to or less than a predetermined stall threshold, the predetermined stall threshold indicating a possibility of an occurrence of a stall of the internal combustion engine; and
return the target ignition timing to an advance side in response to determining that the speed of the internal combustion engine is equal to or less than the predetermined stall threshold.

6. The internal combustion engine control method according to claim 4, wherein predicting that the load of the power generation by the generator is to increase when: a voltage of a battery configured to be charged with a current generated by the generator is unlikely to decrease for a reason other than consumption of a current equal to or greater than a predetermined reference; a decrease rate of the voltage of the battery is equal to or greater than a predetermined first threshold; and the current generated by the generator is equal to or greater than a predetermined second threshold.

7. The internal combustion engine control apparatus according to claim 5, wherein the circuitry is configured to predict that the load of the power generation by the generator is to increase when: a voltage of a battery configured to be charged with a current generated by the generator is unlikely to decrease for a reason other than consumption of a current equal to or greater than a predetermined reference; a decrease rate of the voltage of the battery is equal to or greater than a predetermined first threshold; and the current generated by the generator is equal to or greater than a predetermined second threshold.

* * * * *